United States Patent [19]
Lee et al.

[11] 3,852,591
[45] Dec. 3, 1974

[54] GRADED BANDGAP SEMICONDUCTOR PHOTODETECTOR FOR EQUALIZATION OF OPTICAL FIBER MATERIAL DELAY DISTORTION

[75] Inventors: Tien Pei Lee, Middletown; Tingye Li, Rumson, both of N.J.

[73] Assignee: Bell Telephone Laboratories Incorporated, Murray Hill, N.J.

[22] Filed: Oct. 19, 1973

[21] Appl. No.: 408,086

[52] U.S. Cl. ...... 250/211 J, 317/235 N, 350/96 WG
[51] Int. Cl. ............................................. H01j 39/12
[58] Field of Search........... 350/96 R, 96 B, 96 WG, 350/96 T; 250/211 J; 317/235 N, 235 AC, 235 AP; 313/108 R, 108 D

[56] References Cited
UNITED STATES PATENTS

| | | | |
|---|---|---|---|
| 3,458,779 | 7/1969 | Blank | 313/108 D |
| 3,496,024 | 2/1970 | Ruehrwin | 317/235 N |
| 3,591,431 | 7/1971 | Pruett | 317/235 N |
| 3,636,416 | 1/1972 | Umeda | 317/235 AC |
| 3,675,026 | 7/1972 | Woodall | 250/211 J |
| 3,677,836 | 7/1972 | Lorenz | 317/235 N |

Primary Examiner—Archie R. Borchelt
Assistant Examiner—D. C. Nelms
Attorney, Agent, or Firm—D. I. Caplan

[57] ABSTRACT

In optical fiber transmission, one of the causes of signal distortion (pulse broadening) stems from the fact that energy at different optical wavelengths travels at different velocities in the fiber material (material dispersion), and hence these wavelength components undergo different time delays while propagating through the fiber. In order to reduce this optical distortion, a p-n junction photodiode made of a graded bandgap semiconductor material is disclosed as a delay equalizing detector. The gradient of the bandgap is made in such a manner that the different time delays of drifting charge carriers, generated by the absorption of different wavelengths at different depths in the graded bandgap semiconductor, can be made to compensate for the time delays suffered by the optical energy at different wavelengths while propagating through the fiber.

13 Claims, 2 Drawing Figures

GRADED BANDGAP SEMICONDUCTOR PHOTODETECTOR FOR EQUALIZATION OF OPTICAL FIBER MATERIAL DELAY DISTORTION

FIELD OF THE INVENTION

This invention relates to optical communications systems, and more particularly to semiconductor photodetector delay equalizers for use in such systems.

BACKGROUND OF THE INVENTION

Optical fibers drawn from optically transparent materials, such as glass or quartz, can be used as the low-loss transmission medium for optical communications systems. The index of refraction of these transparent materials is dependent on optical wavelength (material dispersion), so that energy of different optical wavelengths undergoes different time delays while propagating through the fiber from its input end to its output end. When using an incoherent optical source of relatively large spectral width, such as a light-emitting semiconductor diode (LED), for producing the optical carrier wave in the fiber, a relatively narrow input signal pulse of time duration $t_1$ at the input end of the fiber emanates from the output end of the fiber as a relatively broad output signal pulse of duration $t_2$ greater than $t_1$ by an undesirably large amount. This broadening of output pulse, which is due to material dispersion, is proportional to the difference of time delays in the fiber of the different optical wavelength components of the optical source. Thereby, the optical fiber material dispersion sets a limit on the maximum signal bit rate capability of an optical transmission system. This is undesirably low in a system which employs an incoherent optical source such as an LED, whose spectral width is typically about 300 to 500 angstroms. For fiber materials such as quartz, this spectral width would give rise to a pulse broadening of 3 to 5 nanoseconds per kilometer of fiber. In many instances, this problem of fiber material dispersion imposes a more severe limitation upon the maximum information data rate obtainable than that imposed by the problem of multimodes, such multimodes (at a given wavelength) propagating at different velocities in the fiber. Therefore, it would be desirable to have a means for equalizing the distortion caused by broadening of optical signal pulses propagating through an optical fiber caused by the fiber's material dispersion.

SUMMARY OF THE INVENTION

In order to compensate for optical fiber material dispersion, a photodetector consisting of a p-n semiconductor junction integrated in a graded bandgap monocrystalline semiconductor body portion is located at the output end of the optical fiber to detect and, at the same time, to equalize the distorted signal. The charge carriers generated by the absorption of the signal photons in the graded bandgap semiconductor portion drift toward the p-n junction where they are collected. The grading of the bandgap in the semiconductor advantageously is made to vary in a specified manner according to the fiber material dispersion property. For fiber materials such as quartz and most glasses, a substantially linear grading of bandgap with distance away from the p-n junction is useful, so that the locations at which different wavelength components of the optical radiation are absorbed vary likewise substantially linearly with distance from the p-n junction. The drifting of the charge carriers in the delay line is produced by means of a reverse bias voltage applied across the semiconductor body. The portion of the body, in which charge carrier drift occurs, advantageously is also characterized (in addition to the graded bandgap) by an exponentially increasing concentration of net significant impurities of one conductivity type going away from the junction. The electric field in response to applied voltages, which cause the charge carriers to drift to the semiconductor p-n junction, thereby is advantageously substantially uniform. In this way, the substantially linear variation of time delay with optical wavelength in the optical fiber can be substantially compensated by the linearly varying corresponding drift delay times of the electron charge carriers produced in the graded bandgap semiconductor portion in response to the optical radiation.

In a specific embodiment of the invention, upon a $p^+$ type gallium arsenide substrate is located a first epitaxial layer of p-type aluminum gallium arsenide semiconductor characterized in that the concentration of aluminum increases substantially linearly with distance away from the surface of the gallium arsenide substrate. Upon the then exposed surface of the aluminum gallium arsenide epitaxial portion of varying aluminum composition is located a second epitaxial layer of aluminum gallium arsenide having a uniform concentration of aluminum which is advantageously the same as that which is present at the exposed surface of the first aluminum gallium arsenide layer (of spatially varying aluminum composition). However, the second aluminum gallium arsenide layer advantageously is characterized by a uniform $n^+$ type conductivity, thereby forming a p-n junction with the aluminum gallium arsenide portion of varying aluminum composition.

In operation, the optical energy exiting from an optical fiber is incident upon the exposed surface of the second ($n^+$ type) aluminum gallium arsenide layer. This radiation penetrates this $n^+$ layer and is then absorbed in the first aluminum gallium arsenide layer (of varying composition of aluminum) at locations therein according to the wavelength of the respective components in the radiation. The distance from the p-n junction of these locations, where the various optical wavelength components are absorbed, varies substantially linearly with wavelength, the shortest wavelengths (most delayed in fiber) being absorbed closest to the p-n junction and the longest wavelengths (least delayed in fiber) being absorbed farthest therefrom. The electrons of the electron hole-pairs created by the absorption of the optical radiation then drift under an applied electric field in the first layer to the p-n junction where they produce a current signal in the external circuit. Since the electric field at the p-n junction is much higher than elsewhere in the first layer, only when an electron reaches the p-n junction will a significant signal be detected in the external circuit (and not while an electron is yet drifting towards the p-n junction).

BRIEF DESCRIPTION OF THE DRAWING

This invention, together with its objects, features and advantages, will be better understood when taken in consideration with the drawing in which.

For the purpose of clarity only, none of the drawings is to scale.

DETAILED DESCRIPTION

Figure 1:
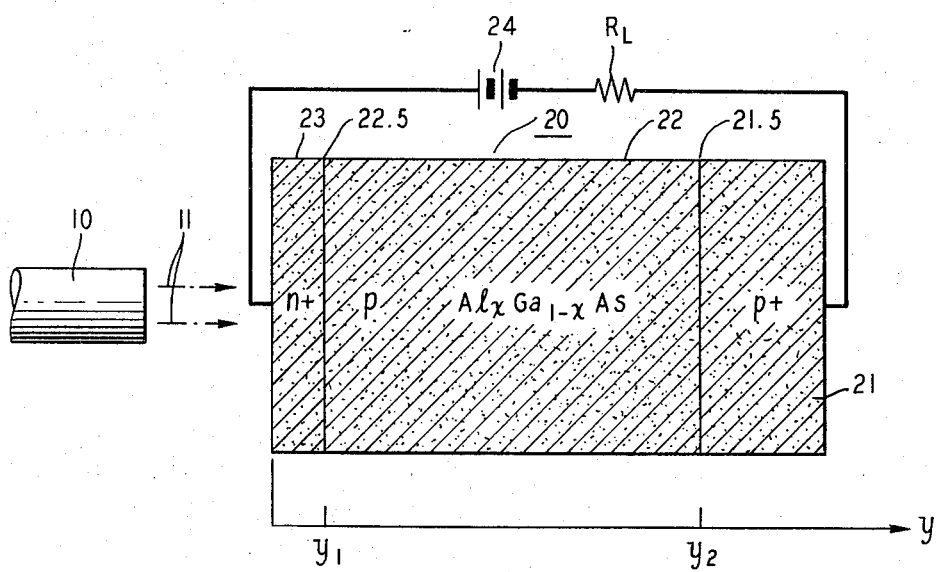
FIG. 1 is a diagram, partly in cross section, of a graded bandgap semiconductor photodetector apparatus in accordance with a specific embodiment of the invention.

As shown in FIG. 1, an optical fiber 10 provides an exit beam of optical radiation 11 which is incident upon a graded bandgap semiconductor photodetector 20. The photodetector 20 includes a substrate 21 of p-type conductivity gallium arsenide, advantageously having a single crystal structure. Upon the interface 21.5 of the substrate 21 is situated a graded bandgap semiconductor first epitaxial layer 22 of $Al_xGa_{1-x}As$, that is, the proportion $x$ of aluminum varies with distance in the $y$ direction from the interface 21.5. Upon the interface 22.5 of the epitaxial layer 22 is situated a second epitaxial layer of $n^+$ (strongly $n$) type conductivity $Al_x$-$Ga_{1-x}As$, thereby forming a p-n junction at this interface 22.5. Advantageously, the concentration of aluminum in the first layer 22 varies from zero at the interface 21.5 to a value $x_1$ at the interface 22.5 substantially linearly with distance in the $y$ direction from the interface 21.5, and the concentration of aluminum in the second epitaxial layer 23 is uniformly of the same value as at the p-n junction interface 22.5 in the first layer 22. Moreover, the net concentration of significant acceptor impurity doping in this first layer 22 advantageously is made exponentially increasing with distance in the $y$ direction from the p-n junction 22.5. In this way, by reason of this exponential doping profile, the electric field in the first layer 22 will be substantially uniform with distance $y$. Hence, the drift velocity of charge carriers will be substantially the same throughout this first layer 22.

A battery 24 provides reverse bias to the p-n junction 22.5 by applying a voltage of positive polarity to the epitaxial layer 23 and a voltage of negative polarity to the epitaxial layer 21 through a load resistor $R_L$. The electrical contacts of the battery 24 to the detector 20 are advantageously made by means of ohmic layers (not shown for the purpose of clarity), on the exposed surfaces of the layer 23 and on the substrate 21, it being understood that the ohmic layer on the exposed surface of the layer 23 should be transparent to the radiation 11 incident thereon. Alternatively, this ohmic layer can be opaque provided it covers only a portion of the surface 23.

Figure 2:
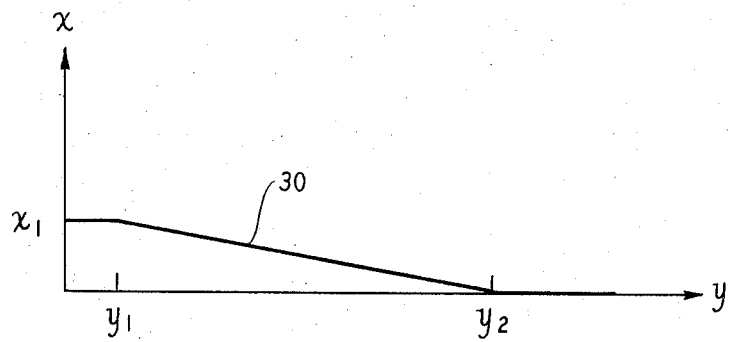
FIG. 2 is plot of the relative proportion of aluminum in the semiconductor vs. distance, in the specific embodiment shown in FIG. 1.

FIG. 2 shows a plot 30 of the profile of the relative composition of aluminum ($x$) to gallium ($1-x$) in the various layers of the detector 20. As indicated by the curve 30, the concentration of aluminum is substantially the same throughout the second epitaxial layer 23, with a value $x=x_1$. At the p-n junction 22.5, having a $y$ coordinate $y_1$ (FIG. 1 and FIG. 2), the relative concentration of aluminum in the first layer 22 decreases substantially linearly with distance $y$ going away from the p-n junction 22.5, reaching a value substantially equal to zero at the interface 21.5, and continuing at a value of zero throughout the substrate 21. With the linearly graded profile of aluminum relative to gallium as thus indicated by curve 30 in FIG. 2, the forbidden energy bandgap in layer 22 is a maximum at $y_1$ and decreases substantially linearly with distance $y$ going away from the p-n junction at $y_1$, reaching a minimum value at $y_2$ (the interface 21.5 of the first layer 22 with the substrate 21). In this way, in operation, the optical radiation 11 incident on the detector 20 penetrates through the relatively thin second epitaxial layer 23 and is absorbed at different depths of penetration $y$ in the first epitaxial layer 22 in accordance with the wavelength components in the radiation 11. In particular, the longer wavelengths (less delayed in the fiber) will be absorbed at larger distance $y$ away from the p-n junction 22.5 than will be the shorter wavelengths (more delayed in the fiber). The process of absorption in the first layer 22 of the various wavelength components generates electron hole-pairs at the various positions of absorption in accordance with the wavelength. The electrons of these hole-pairs will drift toward the p-n junction 22.5 under the influence of the electric field produced by the battery 24. When these drifting electrons reach the p-n junction, they suddenly find themselves in a much higher electric field corresponding to a depleted p-n junction due to the reverse biasing of the battery 24. At this moment when the electrons reach the p-n junction where they are collected, a sudden increase in current will be observed in the load $R_L$, due to the sudden experiencing of a relatively high electric field interaction by the drifting electrons. Since the longer wavelengths are absorbed at larger distances from the p-n junction 22.5, the electrons produced by the absorptions of these longer wavelength components will drift through a larger distance to the p-n junction 22.5 than will the electrons generated by the absorption of shorter wavelengths closer to the p-n junction 22.5. Thus, the detector 20 produces a delayed detection characterized by a greater delay for the longer wavelength components than for the shorter wavelength components. Thereby, the detector 20 is useful for compensation of the time delays of the different optical wavelength components of the radiation experienced while propagating through the fiber 10, wherein those optical wavelength components of longer wavelength have a faster group velocity (corresponding to a smaller time delay) and are more delayed in the detection process of the detector 20 than the shorter wavelength components (which are more delayed in the fiber and are less delayed in the detection process).

In a typical example, by way of illustration only, the substrate 21 is p-type conductivity gallium arsenide, having a thickness in the $y$ direction of about 0.4 to 0.5 millimeters and characterized by a net significant acceptor impurity concentration of about $5 \times 10^{18}$ to $5 \times 10^{19}$ per cubic centimeter. The first epitaxial layer 22 is $Al_xGa_{1-x}As$ in which (as indicated in FIG. 2) $x$ varies substantially linearly with distance from zero at $y_2$ (interface 21.5) to a value of about 0.055 at $y_1$ (p-n junction 22.5), the thickness ($y_2-y_1$) in the $y$ direction of this layer 22 being approximately 25 to 40 microns. In addition, the doping concentration of net significant acceptor impurities in the first epitaxial layer 22 varies substantially exponentially from $5 \times 10^{18}$ to $5 \times 10^{19}$ per cubic centimeter at $y_2$ down to about $10^{17}$ per cubic centimeter or lower at $y_1$. The second epitaxial layer 23 is $Al_xGa_{1-x}As$ having a thickness of about 2 microns, in which $x$ is equal to about 0.055 throughout (the same value as at $y_1$) and in which the net donor impurity concentration is about $10^{19}$ per cubic centimeter.

In the foregoing illustrative example, as a result of the substantially linear variation with distance of the composition of aluminum relative to gallium in the epitaxial layer 22, the forbidden energy bandgap in this first layer 22 varies from about 1.43 electron volts at $y_2$ substantially linearly with distance up to a value of about 1.50 electron volts at $y_1$. In turn, this corresponds to the absorption of wavelength components of about 8,700 angstroms predominantly in the neighborhood of the interface 21.5 at $y_2$, decreasing to about 8,300 angstroms predominantly in the immediate neighborhood of the p-n junction at the interface 22.5 at $y_1$. The battery 24 provides a voltage of about 15 volts in order to produce an electric field of about 50 volts per centimeter in the epitaxial layer 22, as well as to deplete the neighborhood of the p-n junction 22.5 of substantially all mobile charge carriers to produce a depletion width of about 0.4 microns.

In order to fabricate the first epitaxial layer 22, together with its graded bandgap and exponential doping profile, techniques similar to those described in U.S. Pat. No. 3,677,836, issued to M. R. Lorenz on July 18, 1972, may be used. Briefly, in such techniques, the process of liquid epitaxy is used upon the substrate 21, in which the temperature of the liquid is varied at different stages of the growth in order to vary the composition of aluminum relative to gallium in the resulting epitaxial growth. Moreover, while the epitaxial growth is being carried out, a source of acceptor impurities such as germanium or magnesium is placed at a controllably varying temperature in the neighborhood of the epitaxial growth solution (in which the growth is being carried out) so that the concentration of germanium or of magnesium impurities at various stages of the growth can likewise be controlled to be exponential with distance as desired in this invention. Alternatively, molecular beam epitaxial (MBE) growth techniques can be used, such as described by A. Cho et al. in *Journal of Applied Physics*, Vol. 43, pp. 5118–5123 (Dec. 1972).

While this invention has been described in terms of a specific embodiment, various modifications can be made by the worker of ordinary skill in the art without departing from the scope of this invention. For example, semiconductors other than aluminum gallium arsenide can be used such as gallium arsenide phosphide with a graded profile of phosphorus relative to arsenic in the epitaxial layer 22. Such semiconductor material can be prepared, for example, as described in *Journal of Electro-Chemical Society*, Vol. 111, No. 7, pp. 814–817 (1964), "Preparation of $GaAs_xP_{1-x}$ by Vapor Phase Reaction", using gradually varying relative amounts of arsenic and phosphorous in the vapor being passed over the substrate. In addition, still other compound semiconductors may be used such as indium arsenide-phosphide ($InAs_xP_{1-x}$) having a graded composition of arsenic relative to phosphorus. Finally, the profile of the bandgap in the first epitaxial layer should be a mirror image of that shown in FIG. 2 in case the group velocity dispersion relation is in the opposite sense with respect to wavelength from that discussed above (namely that the delay in the fiber is more for shorter wavelengths than for longer wavelengths). The grading profile should match that of the material dispersion characteristics of the fiber, i.e., it need not be linear or substantially linear, as mentioned in the patent.

What is claimed is:

1. Apparatus for equalizing the delay distortion of optical radiation, which comprises
   a semiconductor body portion having a graded energy bandgap terminated by a charge carrier collection means, whereby different wavelength components in said radiation incident upon the body are absorbed in the body portion at different average positions according to said wavelength, thereby producing charge carriers which drift within the body portion having the graded energy bandgap to the charge collection means, said body located in the path of the optical radiation emanating from an optical fiber in which different wavelength components of said radiation undergo different optical time delays in accordance with the material dispersion property of the fiber, said graded energy bandgap being such that the different optical time delays of the different wavelength components in the fiber are substantially compensated by the different delays of the drifting charge carriers in the body portion generated by said wavelength components.

2. Apparatus according to claim 1 which said body portion is characterized in that at least a subportion thereof has a net significant impurity concentration gradient suitable for producing an electric field, in said subportion when a voltage bias is applied across said body portion, which is a more nearly uniform electric field than in the absence of said gradient.

3. Apparatus according to claim 2 in which said gradient is substantially exponential in an increasing sense going away from a first location in the body portion.

4. Apparatus according to claim 3 in which charge collection means includes a p-n junction at the first location, so that the electric field in the immediate neighborhood of the junction is significantly higher than in the remainder of the subportion when the said voltage bias is applied.

5. Apparatus according to claim 4 which further comprises circuit means for applying a reverse voltage bias across the p-n junction whereby a substantially uniform electric field is produced in a region of the subportion removed from the junction.

6. Apparatus according to claim 1 in which the semiconductor portion of graded bandgap is essentially aluminum gallium arsenide having a relative concentration of aluminum which is correspondingly graded to furnish said graded energy bandgap.

7. Apparatus according to claim 6 in which the relative concentration of aluminum varies linearly with distance from a second location, whereby said bandgap correspondingly varies linearly with distance.

8. Apparatus according to claim 7 in which at least a subportion of the body portion is characterized by a net significant impurity concentration gradient suitable for producing a substantially uniform electric field in response to a voltage bias applied across said body portion.

9. Apparatus according to claim 8 in which said gradient is substantially exponential in an increasing sense going away from a first location in the body portion.

10. Apparatus according to claim 9 in which a p-n junction is located at the first location so that the electric field in the immediate neighborhood of the junction is significantly higher than in the remainder of the subportion.

11. Apparatus according to claim 10 which further comprises circuit means for applying a reverse voltage bias across the p-n junction whereby the electric field produced in the subportion is substantially uniform.

12. Apparatus for detecting optical radiation which comprises
a semiconductor body portion having a graded energy bandgap terminated by a p-n junction, in which a region of the graded energy gap has a net significant impurity concentration gradient suitable for producing an electric field, in said subportion when a voltage bias is applied across said body portion, which is more nearly a uniform electric field than in the absence of said gradient.

13. Apparatus according to claim 12 in which the net significant concentration gradient is substantially exponential increasing going away from the P-n junction in said region.

* * * * *